April 1, 1958  P. F. MIDDLETON  2,829,215
SPEED SIGNAL FOR MOTOR VEHICLES
Filed Sept. 23, 1955

INVENTOR.
PAUL F. MIDDLETON
BY
ATTORNEYS

United States Patent Office 2,829,215
Patented Apr. 1, 1958

2,829,215

SPEED SIGNAL FOR MOTOR VEHICLES

Paul F. Middleton, Moorestown, N. J., assignor to Arrow Safety Device Co., Mount Holly, N. J., a corporation of New Jersey Application September 23, 1955, Serial No. 536,194

1 Claim. (Cl. 200—80)

This invention relates to a speed indicating signal for motor vehicles intended to call the attention of a driver to the fact that he may be exceeding a desired speed.

In view of the fact that speed regulations are quite generally strictly enforced and that with modern cars on high speed roads a driver may very easily exceed the speed limit without being aware of the fact, it is desirable to provide a warning when the speed limit is reached. Devices have heretofore been proposed for this purpose, involving connections to the usual speedometer, but there is a need for a simple speed warning device which may be provided simply on vehicles equipped with standard speedometers.

In accordance with the present invention a simple device of this type is provided which may be very readily interposed in the cable connection driving a conventional speedometer. It may also be set very simply by the operator for the particular speed at which warning is desired and will then operate reliably whenever the vehicle reaches such speed.

The objects of the invention having to do with the attainment of these desired ends will be apparent from the following description read in conjunction with the accompanying drawing in which.

Figure 1:
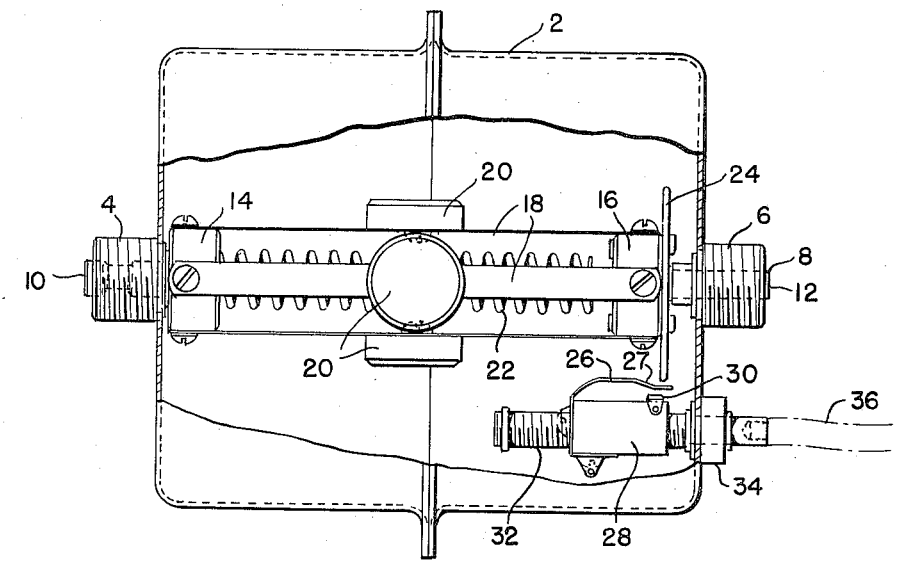
Figure 1 is an elevation, partly broken away, showing a preferred embodiment of the invention.
Figure 2:
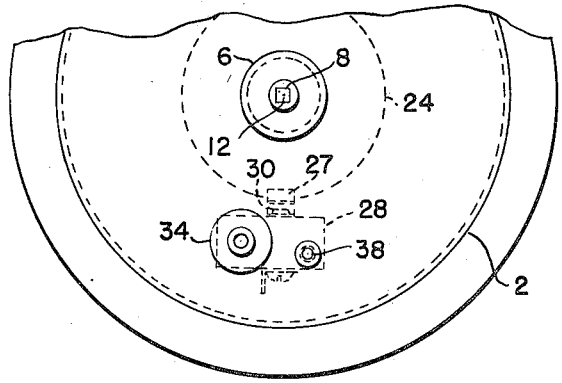
Figure 2 is a fragmentary elevation looking at the right-hand side of the Figure 1.
Figure 3:
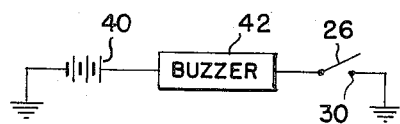
Figure 3 is a wiring diagram illustrating the electrical connections desirably provided.

A housing 2 is provided with externally and/or internally threaded bearing housings 4 and 6 within which are located bearings for a shaft 8, one end 10 of which is adapted to be connected to the usual speedometer cable, while the other end 12 of which is arranged to be coupled to the usual shaft of the conventional speedometer, the threaded arrangements at 4 and 6 being threaded as required for connection, respectively, to the usual cable sheath and to the standard speedometer. In effect, therefore, the shaft 8 is merely interposed in the conventional speedometer driving line.

Secured at one end to the shaft 12 is a collar 14 while a corresponding collar 16 near the other end of the shaft is arranged to slide thereon. These collars are connected by a group of flexible spring members 18 carrying weights 20 at their central portions. A spring 22 surrounding the shaft is arranged to resist left-hand motion, as viewed in Figure 1, of the collar 16 as it is moved toward the left by centrifugal action of the weights 20. What has just been described is essentially a conventional and simple rotary assembly such as is used in centrifugal governors.

The collar 16 carries a disc 24, desirably concentric with the shaft 8, which disc may be made of a wear-resisting insulating material such as a rigid fibre resin composition. Located adjacent to the periphery of the disc 24 is a spring 26 secured on an insulated block 28 threaded on a screw 32 rotatable mounting in a bearing 34 secured to the housing. The spring 26 is arranged to engage a contact element 30. One end of the screw 32 is arranged to be secured to a flexible shaft indicated at 36 which may run through a convenient bearing in the instrument panel of the car where it may be provided with a manipulating knob (not shown). To prevent rotation of the block 28 about the screw it is provided with an opening sliding on a pin 38 extending parallel to the screw and secured in the housing. The contact element 30 is grounded and the spring member 26 is connected by a flexible lead to one terminal of a buzzer 32 the other terminal of which is connected to the ungrounded terminal of the vehicle battery 40. It will be noted that the spring 26 is provided with a cam portion 27, provided by a bent part of the spring, which is adjacent to the disc 24. As the disc 24 moves to the left as viewed in Figure 1 it will engage this cam portion 27 to produce contact between spring 26 and contact member 30 to close the circuit to the buzzer 42.

In the operation of the device, the operator may initially bring his vehicle up to approximately the speed limit and then adjust the block 28 to produce activation of the buzzer, this being effected by rotation of the flexible shaft 36 and screw 32. Thereafter, since the disc 24 will assume the same position when that particular speed is reached, the buzzer will be energized whenever the speed reaches the set limit. If the vehicle passes into a zone having a different speed limit readjustment of the block 28 to a position corresponding to the new speed limit may be effected.

It will be evident that the arrangement may be varied as desired. For example, instead of providing an audible signal by a buzzer, a visible signal in the form of a light in the instrument panel may be provided to be energized by the described arrangement in the same fashion as the buzzer. Desirably, to minimize wear, the arrangement is as shown, in which the disc 24 is concentric with the shaft 8, the buzzer in such case having the usual make and break contacts therein. However, if desired, the disc 24 may be eccentric or cam-shaped so as to produce intermittent contact and closure of the circuit, in which case the buzzer may consist simply of an electromagnet with an armature which will be vibrated in accordance with the making and breaking of the circuit.

It will be evident that various other changes in details may be provided without departing from the invention as defined in the following claim.

What is claimed is:

Speed signalling apparatus for an automotive vehicle comprising rotating means, means positioning said rotating means longitudinally along its axis of rotation in response to centrifugal action and in accordance with vehicle speed, electrical contact means remotely adjustable for movement longitudinally of the axis of rotation of said rotating means, a signal device in circuit with said contact means, displaceable actuating means for said contact means extending longitudinally of the axis of rotation of said rotating means and longitudinally moveable with said contact means, said actuating means being moveable with respect to said contact means in a direction extending substantially radially of said rotating means to actuate said contact means, said actuating means being engageable by said rotating means and displaceable thereby in said radial direction to actuate said contact means and said signal device in circuit therewith, and said actuating means being formed to present a surface to said rotating means displaceable thereby in said radial direction upon contact by said rotating means while providing unobstructed longitudinal passage of said rotating means thereover.

(References on following page)

References Cited in the file of this patent

UNITED STATES PATENTS

| | | |
|---|---|---|
| 1,117,361 | Evans | Nov. 17, 1914 |
| 1,384,730 | Crawford | July 12, 1921 |
| 1,401,396 | Davis | Dec. 27, 1921 |
| 1,790,330 | Smith | Jan. 27, 1931 |
| 2,111,284 | Girl et al. | Mar. 15, 1938 |
| 2,208,904 | Knight et al. | July 23, 1940 |
| 2,494,422 | Wilson et al. | Jan. 10, 1950 |
| 2,677,733 | Haley | May 4, 1954 |
| 2,758,172 | Kromholz | Aug. 7, 1956 |
| 2,777,913 | Kovach | Jan. 15, 1957 |